(12) United States Patent
Haesendonckx et al.

(10) Patent No.: US 9,278,770 B2
(45) Date of Patent: Mar. 8, 2016

(54) METHOD AND DEVICE FOR PRODUCING CONTAINERS WHICH ARE FILLED WITH A LIQUID FILLING SUBSTANCE

(75) Inventors: Frank Haesendonckx, Hamburg (DE); Dieter Klatt, Hamburg (DE); Wilfried Ehmer, Dortmund (DE)

(73) Assignees: KHS GMBH, Dortmund (DE); KHS CORPOPLAST GMBH, Hamburg (DE)

( * ) Notice: Subject to any disclaimer, the term of this patent is extended or adjusted under 35 U.S.C. 154(b) by 302 days.

(21) Appl. No.: 13/982,814

(22) PCT Filed: Jan. 17, 2012

(86) PCT No.: PCT/EP2012/000164
§ 371 (c)(1),
(2), (4) Date: Jul. 31, 2013

(87) PCT Pub. No.: WO2012/104019
PCT Pub. Date: Aug. 9, 2012

(65) Prior Publication Data
US 2013/0313761 A1    Nov. 28, 2013

(30) Foreign Application Priority Data

Jan. 31, 2011  (DE) .................. 10 2011 009 888
Jan. 31, 2011  (DE) .................. 10 2011 009 889
Feb. 11, 2011  (DE) .................. 10 2011 011 076
Feb. 28, 2011  (DE) .................. 10 2011 012 664
Feb. 28, 2011  (DE) .................. 10 2011 012 665

(51) Int. Cl.
*B29D 22/00*    (2006.01)
*B65B 5/02*     (2006.01)
*B29C 49/46*    (2006.01)
*B65B 3/02*     (2006.01)
(Continued)

(52) U.S. Cl.
CPC . *B65B 5/02* (2013.01); *B29C 49/46* (2013.01); *B29D 22/003* (2013.01); *B65B 3/022* (2013.01); *B29C 49/06* (2013.01); *B29C 49/12* (2013.01); *B29C 49/36* (2013.01); *B29C 2049/1228* (2013.01); *B29C 2049/465* (2013.01); *B29C 2049/4626* (2013.01); *B29C 2049/4664* (2013.01); *B29C 2049/5841* (2013.01); *B29C 2049/6018* (2013.01); *B65B 3/22* (2013.01); *B67B 3/20* (2013.01)

(58) Field of Classification Search
None
See application file for complete search history.

(56) References Cited

U.S. PATENT DOCUMENTS 4,076,071 A    2/1978   Rosenkranz et al.
5,346,386 A    9/1994   Albrecht et al.
(Continued)

FOREIGN PATENT DOCUMENTS

DE    2209494 Y    9/1973
DE    2352926      4/1975
(Continued)

*Primary Examiner* — Monica Huson
(74) *Attorney, Agent, or Firm* — Lucas & Mercanti, LLP; Klaus P. Stoffel

(57) ABSTRACT

Method for producing containers which are filled with a liquid filling substance from parisons made from a thermoplastic material, wherein the respective parison is conditioned thermally and is subsequently shaped into the container during a shaping and filling phase in a mold by way of the filling substance as pressure medium, wherein, during the shaping into the container, the parison is preferably guided at least temporarily through a stretching rod and is stretched in the axial direction.

27 Claims, 11 Drawing Sheets

(51) Int. Cl.
*B29C 49/12* (2006.01)
*B65B 3/22* (2006.01)
*B29C 49/06* (2006.01)
*B29C 49/36* (2006.01)
*B67B 3/20* (2006.01)
*B29C 49/58* (2006.01)
*B29C 49/60* (2006.01)

(56) References Cited

U.S. PATENT DOCUMENTS

| | | |
|---|---|---|
| 5,648,026 A | 7/1997 | Weiss |
| 8,017,064 B2 * | 9/2011 | Andison et al. ............... 264/524 |
| 8,714,963 B2 * | 5/2014 | Andison et al. ............... 425/524 |
| 8,758,670 B2 * | 6/2014 | Haesendonckx et al. ..... 264/535 |
| 8,858,214 B2 * | 10/2014 | Andison et al. ............... 425/524 |
| 8,980,162 B2 * | 3/2015 | Haesendonckx et al. ..... 264/521 |
| 2011/0268855 A1 | 11/2011 | Chauvin et al. |
| 2012/0226376 A1 * | 9/2012 | Haesendonckx et al. ..... 700/109 |
| 2012/0266567 A1 * | 10/2012 | Haesendonckx et al. ....... 53/456 |

FOREIGN PATENT DOCUMENTS

| | | |
|---|---|---|
| DE | 4212583 | 10/1993 |
| DE | 4340291 | 6/1995 |
| EP | 0375912 Y | 7/1990 |
| JP | 2000043129 Y | 2/2000 |
| WO | 2010003853 Y | 1/2010 |
| WO | 2011076167 | 6/2011 |

* cited by examiner

METHOD AND DEVICE FOR PRODUCING CONTAINERS WHICH ARE FILLED WITH A LIQUID FILLING SUBSTANCE

The present application is a 371 of International application PCT/EP2012/000164, filed Jan. 17, 2012, which claims priority of DE 10 2011 009 888.7, filed Jan. 31, 2011, DE 10 2011 009 889.5, filed Jan. 31, 2011, DE 10 2011 011 076.3, filed Feb. 11, 2011, DE 10 2011 012 664.3, filed Feb. 28, 2011, and DE 10 2011 012 665.1, filed Feb. 28, 2011, the priority of these applications is hereby claimed and these applications are incorporated herein by reference.

BACKGROUND OF THE INVENTION

The producing of containers by blow forming from parisons that are made from a thermoplastic material, for example from parisons made from PET (polyethylene terephthalate), with the parisons being fed to different processing stations within a blower machine (DE-OS 43 40 291), is known. A blower machine typically exhibits a heating device for the temperature-regulating or preheating (thermal conditioning) of the parisons and a blowing apparatus with at least one blowing station within whose region the previously thermally conditioned parison is expanded biaxially or multiaxially to form a container. The expansion takes place with the aid of a compressed gas (compressed air) as pressure medium which is introduced with a shaping pressure into the parison that is to be expanded. The process sequence with such an expansion of the parison is explained in DE-OS 43 40 291.

The fundamental configuration of a blowing station is described in DE-OS 42 12 583, while possibilities of thermally conditioning the parisons are explained in DE-OS 23 52 926.

According to a typical further-processing method the containers that are produced by blow forming are fed to a downstream filling apparatus where they are filled with the product or filling substance provided. A separate blower machine and a separate filling machine are therefore used. It is also known for the separate blower machine and the separate filling machine to be combined into a machine block, i.e. into a unitized blower/filler apparatus, with the blow forming and the filling still taking place at separate machine components and in chronological sequence.

There have also already been suggestions for producing containers, in particular including in the shape of bottles, from thermally conditioned or preheated parisons and simultaneously filling them with a liquid filling substance which is fed as a hydraulic pressure medium for expanding the parison and for shaping the container with a shaping and filling pressure such that the respective parison is shaped into the container simultaneously as the filling takes place. Such methods in which a simultaneous shaping and filling of the respective container take place can also be referred to as hydraulic shaping methods or hydraulic container shaping.

When the containers are shaped from the parisons by the filling substance itself, i.e. using the filling substance as hydraulic pressure medium, then the shaping and filling of the containers requires only one machine which however exhibits an increased complexity for this purpose. However initial experimental results with such devices indicate that the quality of the produced containers is still significantly below the quality of conventionally produced blow-formed containers. One reason for this is that a large number of process parameters which are available during the execution of normal blow forming are either absent during hydraulic container forming or could not yet be developed.

A further problem with hydraulic container forming is that contamination of the respective shaping and filling station or of the mold which forms this station and which is executed similar to a blow-mold of a blow-forming machine for producing containers from thermally conditioned parisons by blowing with a pressurized gas, must be avoided. Specifically when the filling substance is totally or partially carbonated there is a significant risk of contamination of the respective shaping and filling station due to losses of the filling substance, in particular when the pressure inside the container is lowered, i.e. during the pressure let-down of the container from the very high shaping and filling pressure to ambient pressure. Such losses of filling substance are due in particular to massive foaming during pressure let-down such that it has not so far been possible to use the simultaneous shaping and filling of containers using parisons and using the filling substance as pressure medium (hydraulic forming technology), in particular for carbonated products.

SUMMARY OF THE INVENTION

It is the task of the invention to disclose a method which makes it possible to optimally design a hydraulic forming method and/or a hydraulic [sic] especially also for high throughput rates (number of formed and filled containers per unit of time) and/or for a high $CO_2$ content of the filling substance that is to be introduced into the respective container, and in particular also to effectively avoid the risk of the respective shaping and filling station being contaminated by the filling substance, e.g. by a carbonated filling substance.

In the case of the invention, the filling substance or its fractions or components are fed to the parison and/or to the forming and/or fully formed container in at least one process phase either simultaneously or with a temporal overlap or in at least two process phases or part-phases with a time delay, and on at least two different height levels, for example with different contents of carbon dioxide and/or at different temperatures and/or different pressures, for example at a first, for example higher pressure, e.g. a pressure ranging between 8 bar and 15 bar, on an upper height level or on this upper height level simultaneously or temporally overlapping also on at least one lower height level and at a second, for example lower pressure, e.g. a pressure below 6 bar, on the at least one lower height level.

In order to ensure the highest possible product quality, the respective parison is preferably guided during its forming into a developing container bubble and then into the container exhibiting the final contour or shape, such that a center typically arranged in the region of a parison dome is defined and reproducibly positioned. Such defined positioning is important because during the forming or expanding of the parison into the container, a biaxial orientation of the parison's material is carried out for which a targeted and predefinable material distribution within the wall of the formed container is required. Unwanted and in particular uneven material distributions can be expected during uncontrolled container forming by contrast.

An especially effective guiding during the shaping and filling phase is possible with the use of a stretching bar or stretching rod whereby the filling substance is fed for example at least in part through the stretching rod. Alternatively or in addition, the filling substance may also be fed at least in part past the stretching rod.

Regular hydraulic container shaping is achieved by the filling substance being fed at least for a time at a constant volumetric flow rate. Possibilities of influencing the material distribution within the wall of the container as it is created or formed are offered by the filling substance being fed at a variable volumetric flow rate at least for a time.

An extremely compact design is assisted by the containers being formed, filled and sealed on a rotating process wheel or rotor.

Another embodiment consists in a generated stretching force being measured. Only low stretching forces which are to be applied by the stretching rod can be guaranteed by a volumetric flow rate of the filling substance being controlled as a function of a measured stretching force.

Independently of or additionally to the afore-mentioned features, as a further embodiment of the invention the inventive method is preferentially configured such that for the introduction of the filling substance on at least two different height levels at least one component of the filling substance is fed past the stretching rod and at least one further component is fed through the stretching rod, and/or that the filling substance comprises at least two fractions or components with different carbon dioxide concentrations, and/or that on the at least two different height levels the filling substance or fractions or components thereof having different concentrations of carbon dioxide are fed, preferably that fraction of the filling substance which contains a higher concentration of carbon dioxide than at least one other fraction of the filling substance, on the lower height level, and/or that the filling substance or fractions or components thereof having the higher concentration of carbon dioxide are cooled or fed cooled, preferably at a temperature below the temperature of that fraction of filling substance which exhibits no carbon dioxide or a lower concentration of carbon dioxide, and/or that the fraction of filling substance having the higher concentration of carbon dioxide is fed through the stretching rod, and/or that the introduction of the filling substance on the at least two different height levels is effected with a time delay or simultaneously or temporally overlapping, and/or that the introduction of the filling substance or of the fractions of the filling substance on the at least two height levels is effected at different pressures, and/or that the stretching rod is thermally insulated, at least in certain regions, from the filling substance, and preferably in a region in which is fed the filling substance or fraction of filling substance exhibiting the higher concentration of carbon dioxide and/or the lower filling substance temperature, and/or that at least one partial stream of the filling substance is introduced with minimal turbulence into the interior of the parison or of the forming container, and/or that the filling substance or fraction of filling substance having the higher concentration of carbon dioxide is not introduced on the lower height level until the filling substance already introduced into the parison or forming container at least completely or almost completely covers a filling substance inlet which is intended for introducing the filling substance having the higher concentration of carbon dioxide, that the carbon dioxide content or CO2 content of the filling substance or of the fraction or component of the filling substance having the higher CO2 concentration is 30 weight percent, preferably 50 to 100 weight percent, above the CO2 content of the filling substance or of the fraction or component of the filling substance with no CO2 content or with reduced CO2 content, and/or that the temperature of the filling substance or of the fraction or component of the filling substance having the higher CO2 concentration is below 10° C., in particular between 4° C. and 8° C., and/or that the pressure of the filling substance or of the fraction or component of the filling substance having the higher CO2 concentration is at least for a time during the forming process higher that at least one other fraction of the filling substance, in particular at least 1 bar higher, and/or that on the flow path of the filling substance or fraction of the filling substance flowing inside the stretching rod, a throttle element or constriction of the cross-section is provided, with the throttle element being arranged in particular just before at least one outlet configured on the stretching rod, whereby the afore-mentioned features may be provided individually or in any desired combination.

In a further embodiment of the invention, the inventive device is preferably configured such that a cooling apparatus is provided along a line or along a line section for that filling substance in which carbon dioxide is released downstream, i.e. after it has cooled and flowed through the line or line section, or which flows to the line or line section from a carbonating unit, and/or that the at least one shaping and filling station is configured with at least one first filling substance outlet for the introduction of the filling substance on the higher height level and with at least one second filling substance outlet for the introduction of the filling substance on the lower height level, that the at least one first and the at least one second filling substance outlet are so provided that during the shaping and filling process they open out into the interior of the parison or of the forming container, and/or that the at least one second filling substance outlet is provided on the element acting like a filling tube and/or is configured by at least one outlet opening which is shaped with rounded edges, preferably on both sides with rounded edges, and/or is formed in the shape of a funnel or cup, and/or that the axis of the main flow direction of the at least one second filling substance outlet or of the opening which forms that outlet is inclined relative to an axis oriented square to the plane of the support at an angle of less than 80°, preferably at an angle of 60-75°, which (angle) opens toward a side facing away from a support for an open end of the respective parison, and/or that the element acting like a filling tube can be controlled by axial displacement in such a way that the introduction on the at least two different height levels is effected through the at least one filling substance outlet provided on this element, and/or that at least one line section in which is guided the filling substance or fraction of filling substance with the high CO2 content is lined with insulation, for example with Teflon or a Teflon-bearing material, whereby the afore-mentioned features may be provided individually or in any desired combination.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

For the purpose of the invention the expressions "essentially", "in essence" or "around" mean variations from the respective exact values by +/−10%, preferably by +/−5% and/or variations in the form of changes insignificant for the function.

The invention is explained in detail below through the use of embodiment examples with reference to the figures. In the figures:

DETAILED DESCRIPTION OF THE INVENTION

Figure 1:
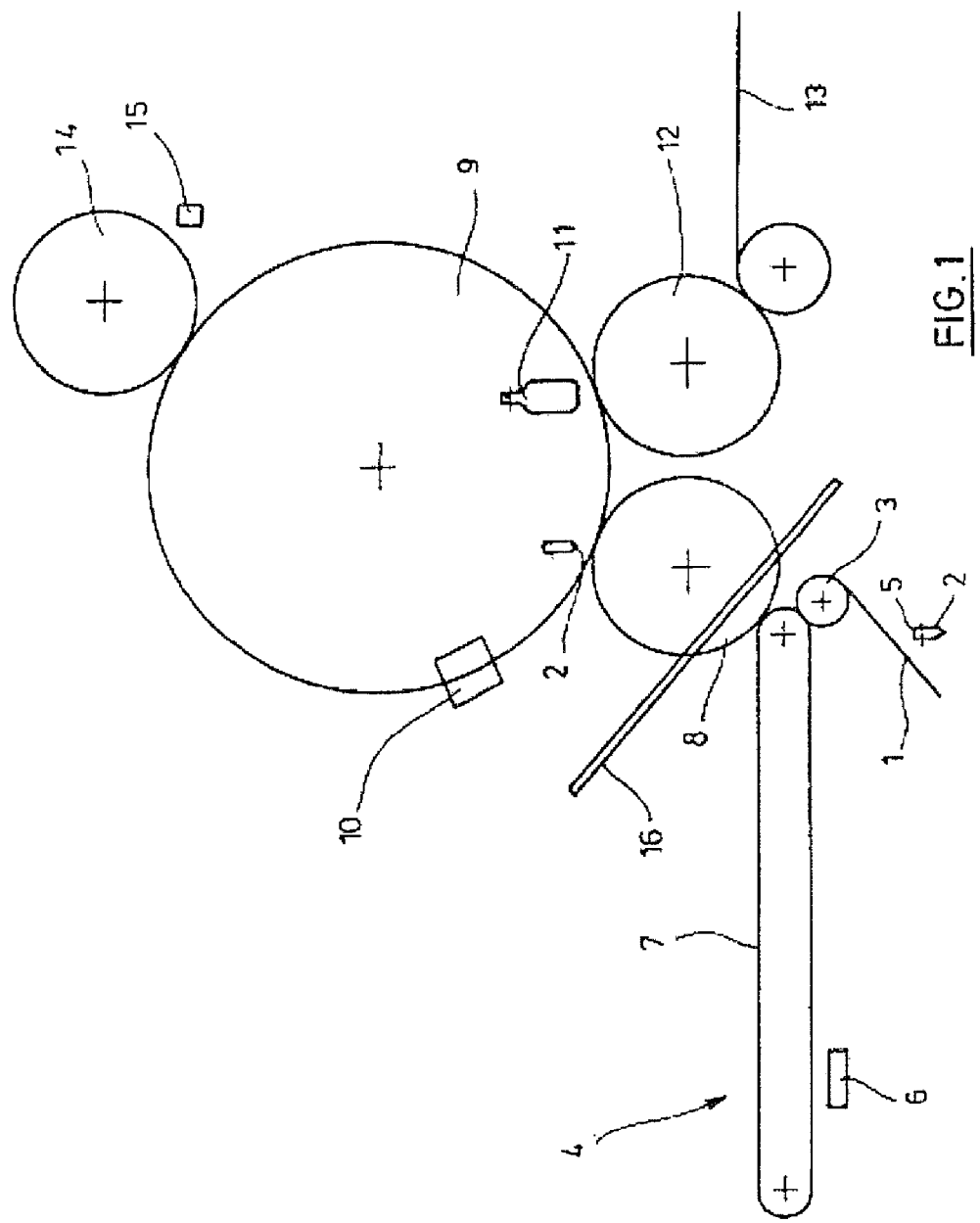
FIG. 1 shows a schematic representation of a basic layout of an apparatus or shaping and filling machine for carrying out hydraulic container forming using a filling substance.

The basic layout of a combined shaping and filling device or shaping and filling machine is shown in FIG. 1. Schematically represented parisons (2), also known as preforms, are fed by a feeding apparatus (1) from a heating apparatus (4) with the use of a transfer wheel (3). In the region of the heating apparatus (4) in which the parisons (2) are preheated or thermally conditioned, depending on the application the parisons (2) can for example be conveyed with their mouth sections (5) pointing vertically up or down. The heating apparatus (4) is equipped for example with heating elements (6) arranged along a transport apparatus (7). A circulating chain for example can be used as transport apparatus (7). IR lamps or light emitting diodes or NIR lamps for example can be used as heating elements (6).

Following adequate temperature-regulating (also known as thermal conditioning) the parisons (2) are transferred by a transfer wheel (8) to a rotor or process wheel (9) which is rotatably arranged, i.e. it can be driven to rotate about a vertical machine axis, or to shaping and filling stations (10) provided on the rotor or process wheel (9). The process wheel (9) is equipped with a plurality of such shaping stations (19) within whose region both a shaping of the parisons (2) into the schematically represented containers (11) and a filling of the containers (11) with the supplied filling substance is effected. The shaping of each container (11) is effected simultaneously with the filling, with the filling substance acting as a pressure medium during the shaping.

After they have been shaped and filled the containers (11) are conveyed away from the process wheel (9) by an extractor wheel (12) and passed to a discharge section (13). According to the embodiment in FIG. 1, it is proposed to feed schematically represented sealing elements (15) to the process wheel (9) via an input device (14). This makes it possible to also carry out a sealing of the containers (11) while already on the process wheel (9) and to handle fully shaped, filled and sealed containers (11) using the extractor device (12). The sealing element (15) can be configured as for example a screw-on cap, crown stopper or sealing foil.

Different thermoplastic materials can preferably be used as material for the parisons (1). Polyethylene terephthalate (PET), polyethylene (PE), polyethylene naphthalate (PEN) or polypropylene (PP) might be named in this context. The dimensioning and weight of the parisons (2) can be adapted to the size, weight and/or design of the containers (11) that are to be produced.

A plurality of electrical and electronic components are typically arranged in the region of the heating apparatus (4). The heating elements (6) are also provided with moisture-sensitive reflectors. Because a filling and shaping of the containers is effected in the region of the process wheel (9) with the use of the liquid filling substance, care must be taken to ensure that an unwanted entrainment of moisture into the region of the heating apparatus (4) is prevented. This can be accomplished for example by a partition (16) offering at least splash protection. It is also possible to suitably thermally condition transport elements used in the region of the transfer wheel (8) for the parisons (2) or to expose them to surges of pressurized gas in such a way that adhering moisture cannot enter the region of the heating apparatus (4).

A handling of the parisons (2) and/or containers (11) is effected preferably using tongs and/or clamping or keying elements which grip the mouth section (5) at least in certain regions from within or without.

Figure 2:
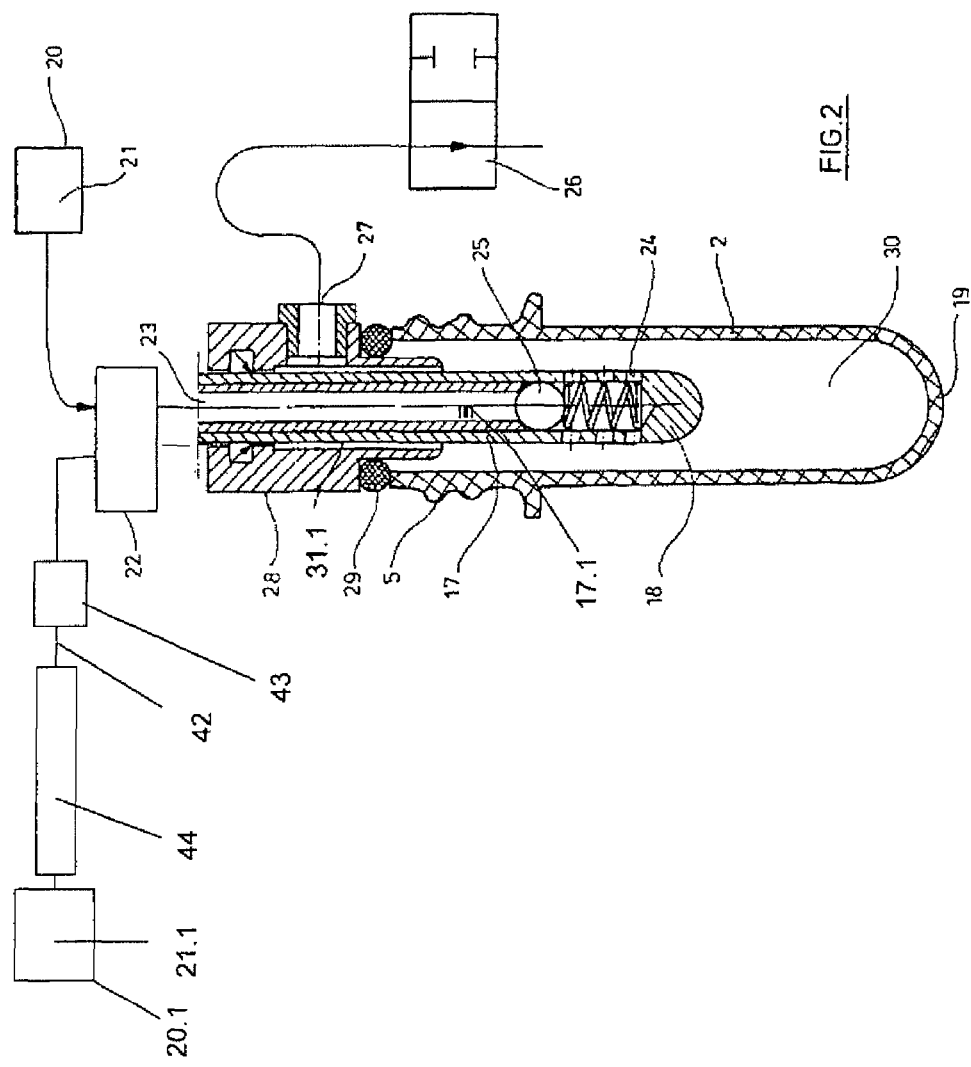
FIG. 2 shows a schematic longitudinal section through a parison with partially introduced stretching rod and a venting device, FIG. 3 show a schematic longitudinal section through a formed container with partly introduced stretching and filling apparatus.

FIG. 2 shows a longitudinal section through a parison (2) into which a stretching bar or a stretching rod (17) is introduced. The stretching rod (17) is used for the at least temporary guiding of the parison (1) as it is shaped to become the container (11). Typically there is contact between a dome (18) of the stretching rod (17) and a base (19) of the parison (2). Further introduction of the stretching rod (17) into the parison (2) brings about a longitudinal stretching of the parison (2). On completion of the stretching operation or at least for a time already during the stretching operation a filling substance (21) taken from a storage apparatus (20) is introduced into the parison (2).

The filling substance (21) is metered using a multi-port metering valve (22). In the depicted embodiment the stretching rod (17) is at least in certain regions configured hollow or with a channel. In the region of a wall of the stretching rod (17) are disposed outflow openings (24) which can be isolated from the multi-port metering valve (22) by a non-return valve (25). Unwanted dripping of filling substance (21) out of the stretching rod (17) can be prevented or minimized in this way.

The parison (2) can be vented by way of a vent valve (26). The vent valve (26) is connected to an outflow opening (27) which is disposed in the region of a connection element (28) pressuring the parison (1). The stretching rod (17) can be positioned through the connection element (28). The parison (2) is sealed off from the connection element (28) by a seal (29) which can be configured for example as an O-ring. An interior space (30) of the parison (2) can be connected by an annular gap (31) with the outflow opening (27). The annular gap (31) encircles the stretching rod (17) in certain regions.

Figure 3:
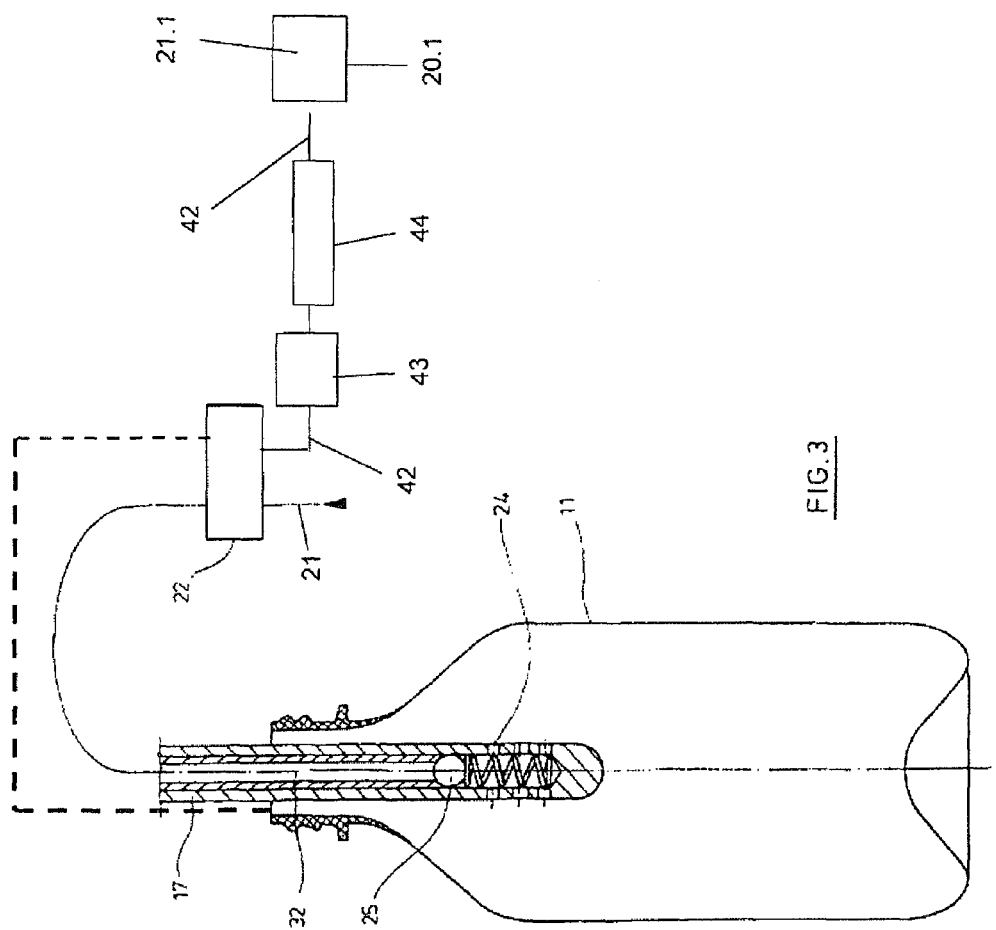
Figure 4:
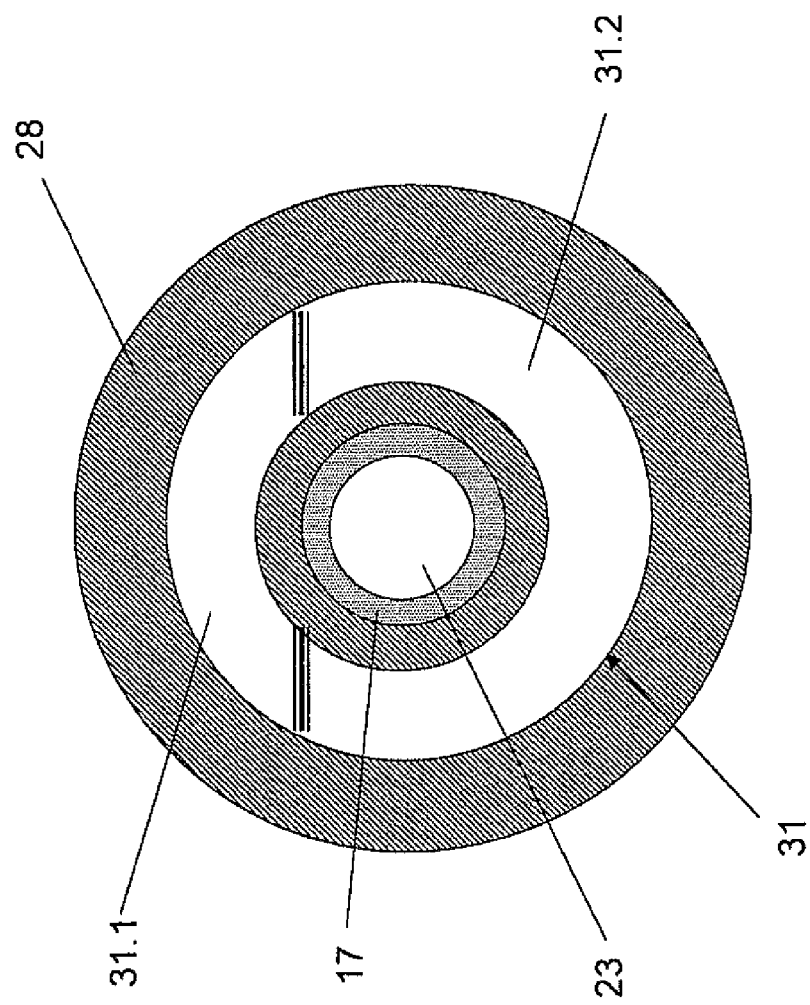
FIG. 4 shows in simplified representation a vertical section through a connection element of the shaping and filling apparatus of FIGS. 2 and 3.

FIG. 3 shows schematically a similar apparatus as in the representation according to FIG. 2 using a hollow stretching rod (17) with an integral non-return valve (25). An already fully formed container (11) is depicted here. In both FIG. 2 and FIG. 3 it can be seen that preferably a plurality of outflow openings (24) is disposed in the region of the stretching rod (17). In the depicted embodiment such outflow openings (24) are positioned at different height levels along a longitudinal axis (32) of the stretching rod (17). The depicted embodiment also shows an orientation of the outflow openings (24) with an essentially horizontal outflow direction. Both the arrangement of the outflow openings (24) in the region of the stretching rod (17) and the orientation of the outflow openings (24) can be varied however, the aim being typically to achieve an outflow characteristic which is as smooth and splash-free as possible.

In the case of the embodiments of FIGS. 2 and 3 the annular gap (31) is divided into two partial annular channels (31.1) and (31.2) of which—in the manner described in greater detailed below—the one partial annular channel (31.1) acts as a return gas channel and the other partial annular channel (31.2) acts as a liquid channel during shaping and filling. Of course the return gas channel and the liquid channel can also be otherwise configured in the connection element (28). The multi-port metering valve (22) is connected by one port to the channel or interior space (23) of the stretching rod (17) and by another port to the liquid channel or partial annular channel (31.2). The vent valve is connected to the outlet (27) of the return gas channel or partial annular channel (31.1).

Figure 5:
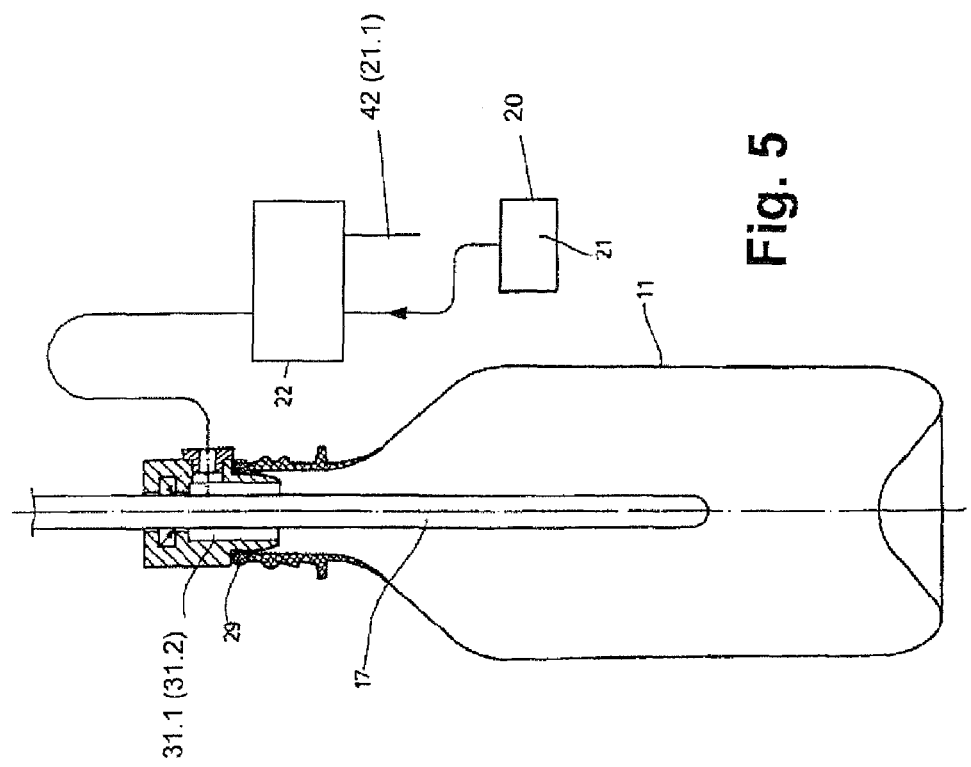
FIG. 5 shows a longitudinal section through a shaping and filling apparatus or shaping and filling station in a modified embodiment.

According to the embodiment in FIG. 5, a solid stretching rod (17) is used. The filling substance (21) is fed along at least one flow channel past the stretching rod (17). The annular gap (31) is preferably used for this purpose. A selected venting can be carried out with this embodiment as well.

Figure 6:
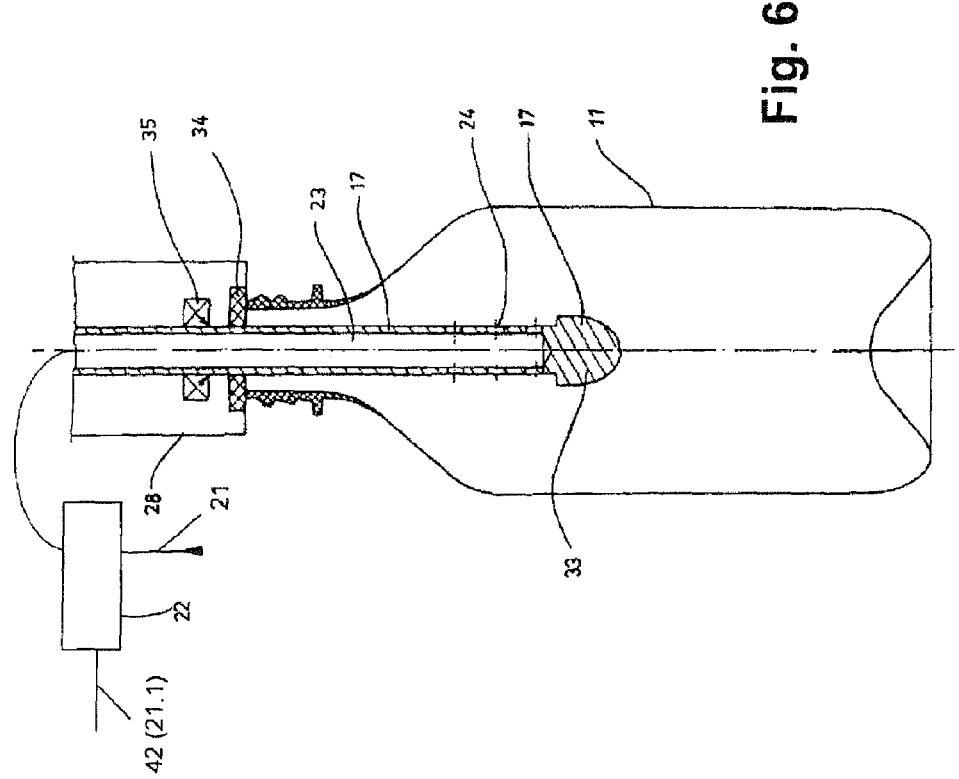
FIG. 6 shows a longitudinal section through a shaping and filling apparatus or shaping and filling station having a seal to prevent dripping.

FIG. 6 depicts an embodiment in which the stretching rod (17) exhibits an optimized embodiment for preventing dripping. A sealing element (33) is disposed in the region of the dome (17) for this purpose. The sealing element (33) can be provided for example by a diameter enlargement of the stretching rod (17). A suitable choice of material is also conceivable. As the stretching rod (17) is retracted back out of the container (11) the sealing element (33) comes into contact with a counter-element (33) [sic] disposed in the region of the connection element (28). The counter-element (34) is preferably executed as a seal. After a corresponding positioning of the stretching rod (17) the outflow openings (24) of the stretching rod (17) are sealed and arranged separately from the container (11) so that a dripping from the interior space (23) of the stretching rod (17) can be reliably avoided. Typically at least one bearing (35) to guide the stretching rod (17) is disposed in the region of the connection element (28).

Figure 7:
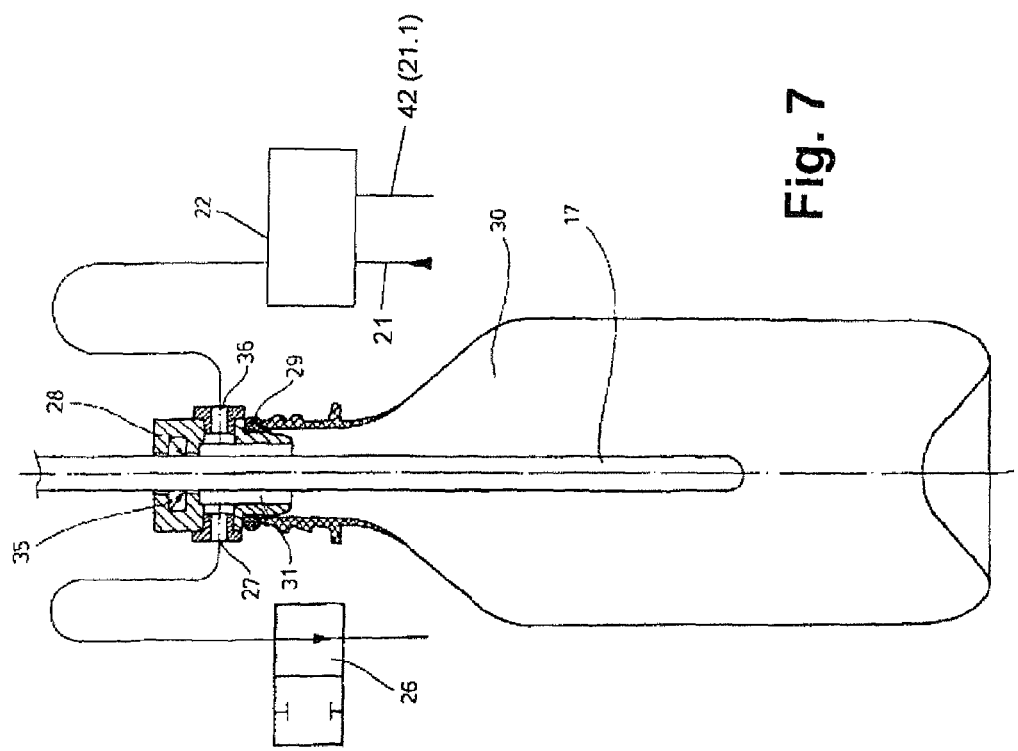
FIG. 7 shows an embodiment with controllable feeding of the filling substance and separate controllable venting.

FIG. 7 shows an embodiment in which again a solid stretching rod (17) is used. Both the multi-port metering valve (22) for the filling substance (21) and the vent valve (26) are connected to the annular channel (31) and—via the latter during shaping and filling—with the interior space (30) of the parison (2) or container (11) through flow channels which run past the stretching rod (17), in particular through the annular gap (31). In the depicted embodiment, the outflow opening (27) is disposed in a radial direction of the connection element (28) opposite a feed opening (36) which is connected to the multi-port metering valve (22).

Figure 8:
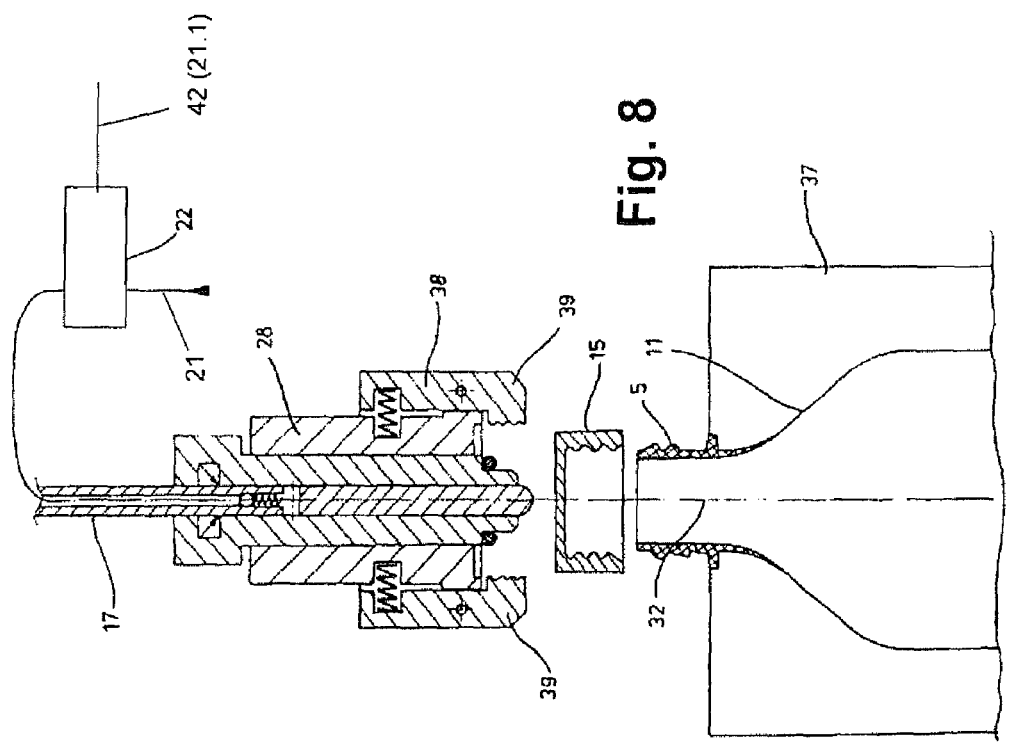
FIG. 8 shows a schematic representation of a combined forming, filling and sealing apparatus or station.

FIG. 8 shows an embodiment in which a sealing of the containers (11) is also effected in the region of the process wheel (9) according to FIG. 1. The container (11) is at this point still disposed in the region of a mold (37) which forms part of the shaping station (10) according to FIG. 1. In this embodiment a sealing device (38) is arranged coaxially to the connection element (28) relative to the longitudinal axis (32). The sealing device (38) exhibits for example grippers (39) that are arranged so as to be pivotable and which are provided to grip the sealing element (15). It is in particular proposed for the sealing device (38) to be arranged rotatably relative to the connection element (28). This allows the sealing element (15) with a female thread to be screwed onto a male thread of the mouth section (5).

Figure 9:
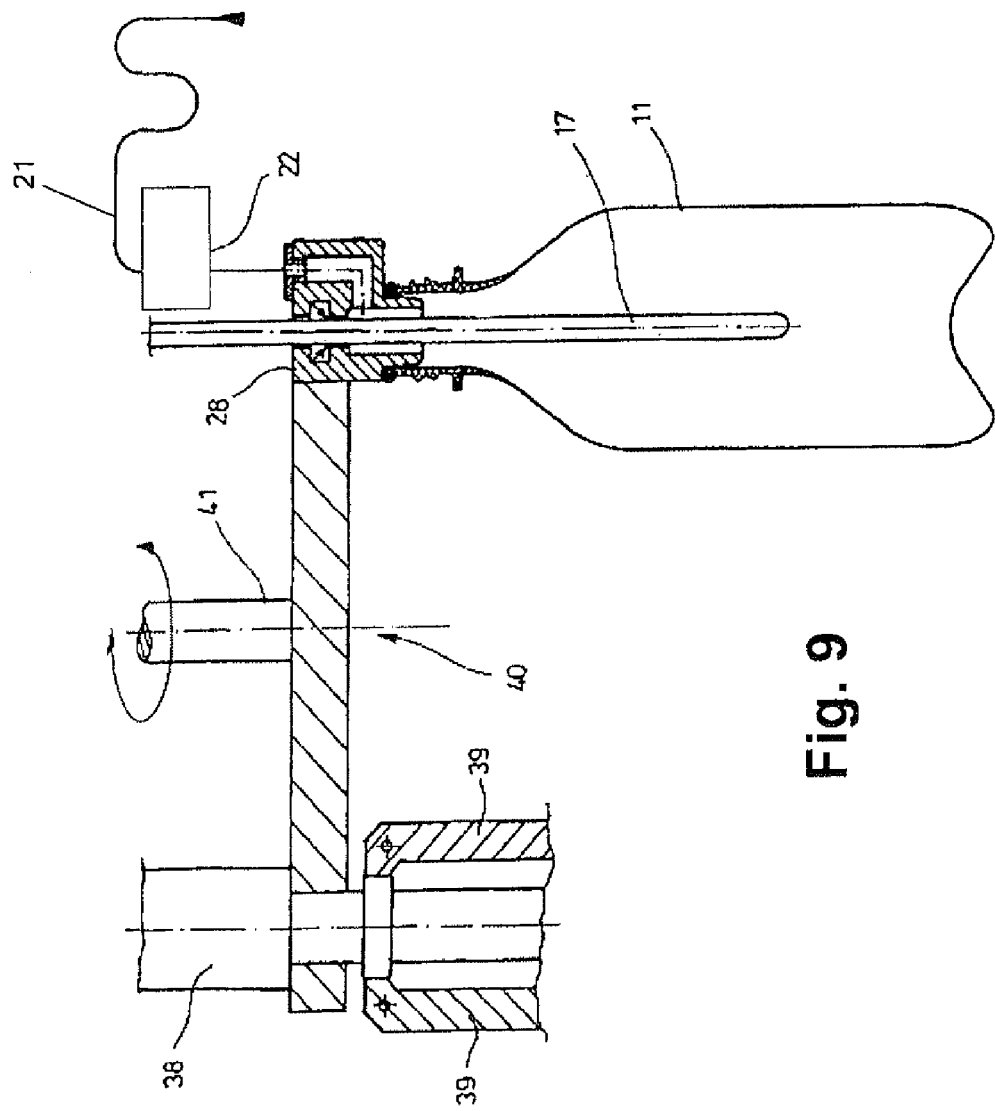
FIG. 9 shows another embodiment of the combined forming, filling and sealing apparatus or station according to FIG. 8, FIGS. 10-12 each show in schematic sectional representation a further embodiment of the stretching rod of a shaping and filling machine or station according to the invention in different process phases.

FIG. 9 shows an alternative embodiment to the configuration according to FIG. 8. Here the sealing device (38) and connection element (28) are not arranged coaxially relative to each other but are positioned by a tool carrier (40) alternately in a working arrangement and a resting arrangement. The tool carrier (40) can be configured for example like a turret and provided with a rotational axis (41).

In the case of the embodiments of FIGS. 8 and 9, in addition to the channel or interior space (23) of the stretching rod (17) there are provided in the connection element (28) a liquid channel not shown in these Figures, for example in the form of the partial annular channel (31.2), as well as preferably a return gas channel, for example in the form of the partial annular channel (31.2).

A number of process-typical parameters are explained in more detail below by way of example. The filling substance (21) is fed to the connection element (28) preferably at a temperature of the surrounding space, ranging for example from 20° C. to 30° C. As a result the filling substance (21) cools the material of the container (11) and assists a rapid form stability of the shaped container (11). A very short cycle time is supported in this way. However the filling substance (21) can also be fed more cooled down or heated up.

During the shaping of the container (11) the filling substance (21) can be introduced into the parison (2) or container (11) with a constant volumetric flow rate at least for a time. It is also possible however to define a suitable time profile for the volumetric flow rate such that different volumetric flow rates are generated at different times.

Air which is present inside the parison (1) can be extracted and/or replaced by an inert gas before the filling substance (21) is introduced. This is advisable in particular with filling media (21) prone to oxidation.

Either pure liquids or liquids containing additives can be used as filling substance (21). In particular, a feeding of carbonated filling media is proposed. Because the filling substance (21) is fed to the parison (1) or container (2) under pressure, for example at a pressure of 10 bar, it is expedient to design all flow paths for the filling substance (21) in such a way that local decompressions due to the flow processes are avoided. A local or sporadic decompression could otherwise result in an outgassing of carbon dioxide.

Alternatively to the heating up of preferably injection-molded parisons (2) depicted in FIG. 1 it is also possible for the parisons (2) to be produced immediately prior to their being shaped into the containers (11). This can be achieved for example by an injection-molding operation as in a so-called single-stage injection-blow method, while compression shaping is also possible. Shaping the parisons (2) in this way avoids using electrical and electronic parts in the region of a heating apparatus or at least essentially reduces the extent to which such parts are used because then they are only needed for any temperature profiling which may be necessary.

Preferably corrosion-resistant materials are used as materials for the parts of the process wheel (9). The use of stainless steels as well as synthetics in particular is proposed. It is in particular proposed to configure the molds (37) entirely or in part from a suitable synthetic.

In order to minimize the necessary stretching forces it is proposed that the stretching operation be assisted by the feeding of the filling substance (21). Care must be taken with such an assistance to ensure that the guiding of the parison (2) through the stretching rod (17) is assured. This can be achieved for example by the applied stretching force being measured and then the volumetric flow rate of the filling substance (21) being controlled such that a minimum stretching force is always maintained. The size of the stretching force can be determined in particular very simply by measuring the drive current of electrically driven stretching systems or by measuring the pressure of pneumatic stretching systems.

When filling containers (11) with the filling substance (21) it is frequently desirable to provide a gas-filled head space once the container (11) has been sealed. This free head space can be generated through the reduction in volume which results from the withdrawal of the stretching rod (17).

The choice of material already referred to above is made in particular having regard to given requirements as to hygiene, with sterilisability being guaranteed in the process. The layout is also designed in such a way that the criteria of good cleanability are satisfied.

One or more of the transfer wheels can be equipped with servo drives.

This in particular helps to realize total separation of the heating apparatus (4) from the process wheel (9) while cleaning operations are in progress. It is also possible to provide retractable handling elements in the region of at least one of the transfer wheels. Further moisture protection can be provided by using a drying air tunnel.

A specific process sequence is described below by way of example. Before or after the placing of the parison (2) into the mold (37) a gas exchange is effected in the interior space of the parison in particular to displace oxygen or reduce the level of oxygen. A purging and/or evacuating operation typically lasts not more than 0.1 seconds. The stretching of the parison (2) with the use of the stretching rod (17) typically takes around 0.2 seconds. A time of around 0.2 seconds is also allowed for the filling and the resulting shaping of the parison (2) to form the container (11). A maximum of 0.2 seconds is typically needed for the subsequent creation of a head space. The process of calming and relieving the filled container is extremely rapid with still beverages; with carbonated beverages this process can take up to 5 seconds.

A treatment of the head space can then be carried out for example using high-pressure foaming or an addition of nitrogen. The subsequent applying of a sealing cap can take up to 1.5 seconds with carbonated beverages. The process of sealing and screwing on the cap can take a time of 1.5 seconds for example.

After the final sealing of the container (11), the mold (37) opens and the filled container (11) is removed and conveyed away.

A typical pressure pattern in the filling system or in the parison (2) or in the containers (11) still in the process of being shaped usually occurs as the filling substance is introduced into the parison (2) that is to be shaped or into the container (11) still in the process of being shaped. Because of the expanding of the container (11) there is initially a comparatively low pressure which then rises towards the end of the shaping process. The corresponding pressure rise or the extent of the pressure rise in the filling system, in particular in the filling line, can be used as a control variable for a subsequent process step and if necessary determine the time at which this next process step is initiated. Alternatively or in addition it is also possible to use the characteristic of the pressure pattern and/or of the volumetric flow rate of the filling substance as control variables.

Regarding the temperature of the filling substance it is in particular possible to feed the filling substance at an ambient temperature. Depending on the respective application constraints however, an increase or decrease in temperature is also conceivable as against filling at ambient temperature.

According to another variant it is proposed to perform the filling operation in two stages during the first process stage the filling substance is fed at a temperature that is greater than the temperature during the second process step. The first process step can be performed for example when the stretching rod (11) is effecting the lengthways stretching of the parison (2).

The second process step then follows the stretching operation and involves the transverse expanding of the container (11).

Regarding the process as briefly referred to above of calming in the head space after depressurizing, it is also proposed to carry out an extraction of forming gases and/or foam if necessary.

Different variants are also conceivable in regard to the sealing of the fully formed and filled container (11). With one variant it is possible to provide some of the handling or shaping and filling stations (10) on the rotor or process wheel (9) with a turret head. The turret head comprises a blowing or shaping and filling head on the one hand and a sealing head on the other. This corresponds to the schematic representation in FIG. 9. It is however equally conceivable to use an integrated design in which the respective head performs all blowing, filling and sealing operations.

According to another variant, the shaping and filling head and the sealing head are configured as separate components but they are disposed so as to be pivotable on each shaping and filling station (10). According to a third variant, only the shaping and filling head is disposed on the rotor or process wheel (9) and the still open container is transferred to a separate sealing device, for example to a transport wheel, which is equipped with a sealing head.

The application of the sealing elements (15), for example sealing caps, can for example take place immediately after the respective mold (37) is opened and the container (11) is picked up by a holding and gripping element. An advantageous variant involves keeping the mold (37) closed and so fixing the containers (11) in the correct position, with just the mouth being presented to receive a sealing element. This presenting is achieved in that either the mold (37) is moved through an angular distance into a radially different position or the shaping and filling head is pivoted or displaced such that the container mouth is presented to receive a sealing element.

As a result, a feeding of the sealing caps on the rotor or process wheel (9) would be effected, in particular it is possible for the mouth space of the filled container (11) to be charged with an inert gas before a feeding of the sealing elements (15).

For the sake of a relatively simple description it has been hitherto assumed that only one storage apparatus (20) is provided for the filling substance (21). In fact however the shaping and filling device or shaping and filling machine exhibits a further storage apparatus (20.1) for a further fraction or a further component of the filling substance which exhibits a higher CO2 content than the filling substance (21) and which is now designated as (21.1).

Through the inventive configuration it is possible to introduce the filling substance (21) into the respective parison (2) by appropriate triggering of the multi-port metering valve (22) on at least two different height levels, specifically into the parison (2) with its opening pressed tightly against the seal (29), i.e. in sealed position with the connection element (28), and/or into the container (11) with its mouth lying in sealed position against the seal (29) on a higher height level through the annular gap (31) or the partial annular channel (31.2) and on a lower or bottom height level through the stretching rod (17) that is introduced into the parison (2) or into the container (11), or through the channel or interior space (23) configured in this stretching rod (17) and the outlet openings (24) present in the lower region or near to the base (19) of the parison (2) or the expanding container (11).

The use of two storage devices (20) and (20.1) offers in particular the possibility, by appropriate triggering of the multi-port metering valve (22), of introducing different components or fractions of the filling substance (21) and (21.1) into the parison (2) or into the expanding container (11) on different height levels, for example one or both filling substance components (21) and (21.1), through the annular gap (31) or partial annular channel (31.2) on the higher level, and one or both components through the channel or interior space (30) of the stretching rod (17) and the outlet openings (24) on the lower height level. The introducing of the filling substance (21) or (21.1) on the different height levels is achieved with the appropriate configuring and triggering of the multi-port metering valve (22), for example simultaneously or temporally overlapping or with a time delay, and specifically in the latter case preferably such that initially, for example in the respective shaping and filling phase, the filling substance, for example the filling substance (21), is introduced through the annular gap (31) or the partial annular channel (31.2) or other liquid channel or path past the stretching rod (17) and into the interior space (30) of the parison (2) and the expanding container (11) on the first higher height level and that only then and after a time delay is the filling substance, for example the filling substance (21.1), introduced through the channel or interior space (23) of the stretching rod (17) on the second lower height level, and preferably not until the outlet opening (24) is completely covered by the filling substance, for example filling substance (21), introduced on the higher level.

To prevent turbulence while the filling substance, for example the filling substance (21.1), is being introduced through the outlet opening (24), the latter is preferably configured internally and/or externally with rounded edges and/or in the shape or a funnel or cup, and specifically with a cross-section opening to the outer or enveloping surface of the stretching rod (17).

Moreover the outlet opening (24) is preferably configured such that its centerline and hence also the centerline of the main flow direction of the filling substance (21) or (21.1) leaving the outlet opening (24) is inclined relative to the centerline of the stretching rod (17), specifically at an angle of less than 80°, preferably at an angle of between 60 and 75°, opening downward, i.e. to the side facing away from the plane of the seal (29).

Using two storage devices (20) and (20.1) also makes it possible to provide the filling substance (21) or (21.1) with different temperatures and/or different pressures and/or a different concentration of carbon dioxide and introduce in into the respective parison (2) or forming container (11).

Through appropriate triggering and configuration of the multi-port metering valve (22) it is also possible to introduce the filling substance (21) and/or (21.1) on the first higher height level and the second lower height level simultaneously.

It has been shown to be particularly advantageous if the afore-mentioned methods are able to achieve an underlayering, specifically in regard to the introducing of the fraction or component of the filling substance (21.1) with a CO2 content or with the higher CO2 content. This is because, in the case of a full or partial carbonation of the filling substance, it has proven problematic to control the rapid pressure let-down after the forming and filling of the containers (11) from the high shaping and filling pressure until the sealing of the respective container, for example at ambient pressure, without loss of product. A massive foaming with loss of product which occurs in the process has so far hindered the use of this hydraulic forming technique for carbonated products.

According to a finding on which the invention is based, it is particularly advantageous, inter alia for avoiding such product losses, if the filling substance (21) or (21.1) or the fractions of the filling substance (21) or (21.1) are fed at least two times or in at least two process phases with different CO2 contents and/or at different temperatures. Here it is expedient to feed the filling substance or filling substance component (21.1) which has the higher concentration of carbon dioxide in a second or subsequent process phase. This has the advantage that although the filling substances (21) and (21.1) brought together in the forming container (11) constitute the hydraulic pressure medium for the shaping of the container (11), the filling substance (21) already introduced into the forming container (11) has calmed or has largely calmed, and further dissolution processes only take place in the liquid volume when the filling substance (21.1) or the fraction of filling substance (21.1) having the higher CO2 concentration is introduced. The second or subsequent process phase is for example a process phase which completes the shaping and filling phase. The introduction of the filling substance (21.1) or fraction of filling substance (21.1) having the higher CO2 concentration into the already present liquid volume is effected preferably underlayered, i.e. for example in the region of the base of the forming container (11). The introducing of the filling substance components or of the filling substance (21) and (21.1) is controlled by the multi-port metering valve (22).

One variant consists in cooling the filling substance (21.1) or fraction of filling substance (21.1) having the higher concentration of carbon dioxide before it is introduced and then in the afore-mentioned second process phase in introducing this filling substance (21.1) or corresponding fraction having the higher concentration of carbon dioxide into the forming container (11) at a lower temperature than the filling substance (21) or fraction of filling substance (21) of the first process phase. This alone generates an underlayer of CO2-rich filling substance, as a result of which foaming, including foaming during pressure let-down, is at least reduced to the extent that detrimental product losses do not occur.

If possible the carbon dioxide content in the second process phase should be 30 weight percent above the carbon dioxide content in the first process phase, in particular 50 weight percent to 100 weight percent above the carbon dioxide content in the first phase. Ideally, a still, i.e. CO2-free, filling substance component, i.e. the filling substance (21), is introduced into the forming container (11) in the first or preceding process phase and a CO2-rich filling substance component, i.e. the filling substance (21.1), in the second process phase.

A variant consists in that the temperature of the filling substance (21.1) or of the fraction of the filling substance (21) of the second process phase is cooled, or is at least 10° C. below the temperature of the first or preceding process phase, in particular less than 10° C. and ideally between 4° C. and 8° C.

It has proven to be advantageous if—at least during the shaping process or during the shaping and filling phase—the pressure of the filling substance (21.1) or of the fraction of the filling substance (21.1) which exhibits the higher carbon dioxide concentration and/or the lower temperature is for at time higher than the pressure of at least one other fraction or of the remaining fraction of the filling substance (21), preferably by at least 1 bar.

The pressure over a line section (42) or a part of the line section through which the filling substance (21.1) or fraction of the filling substance (21.1) having the higher carbon dioxide concentration and/or at the lower temperature is fed should also be higher than the pressure of the remaining filling substance (21) or remaining fraction of the filling substance (21), and specifically 2 bar to 5 bar higher at least for a time during the shaping process.

One embodiment proposes that on the flow path of the filling substance (21) and (21.1) flowing inside the stretching bar (17) there be provided a throttle element or restriction of the cross-section, with the throttle element being disposed for example shortly before at least one outlet (24) of the stretching rod (17) in the direction of flow of the filling substance (21) and (21.1). In this way the beneficial high pressure is maintained until just before the first pressure let-down. This can be further enhanced if part of the filling substance (11) is fed past the stretching rod (17) and part of the filling substance (11) is fed through the stretching rod. Advantageously the filling substance (21.1) with the greater carbon dioxide content should be fed through the stretching rod (17). It is also advantageous if the stretching rod (17) is thermally insulated from the filling substance (21) and (21.1) at least in certain regions.

Thus, to produce filled containers (11) made from a thermoplastic material the shaping and filling device/machine comprises the at least one heating section or heating device (4) arranged along a transport path of a parison (2) and at least one forming and filling station (10) provided with a form.

Among other things the shaping and filling device/machine also comprises a feeding apparatus (1) for the filling substance (21) and (21.1) to be filled into the container (11) as well as a carbonation unit (43) which is provided for example in the line section (42) and with which carbon dioxide can be released at least in the partial stream of the filling substance (21.1), with the shaping and filling station (10) exhibiting a guiding device in the form of a stretching rod (17) which at least for a time grips the parison (2) while it is shaped into the container (11) and with it being possible for at least a part of the filling substance (21) to be guided through the channel or interior space (23) of the stretching rod (17). At least one outlet opening (24) of the channel or interior (23) is provided at the lower end of the stretching rod (17).

A cooling unit (44) is preferentially provided at least along the line section (42) for the filling substance (21.1) in which carbon dioxide is released downstream or which flows from the carbonation unit (43).

At least the line section (42) in which the CO2-rich filling substance (21.1) or a fraction of it is guided should be thermally insulated at least over part of its length, for example with insulation made from Teflon or a material containing Teflon, and/or lined with thermal insulation, for example with Teflon or a material containing Teflon.

Figure 10:
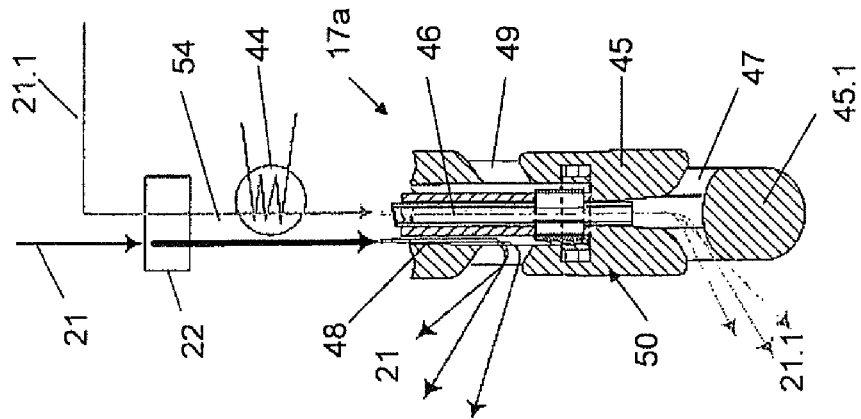
Figure 12:
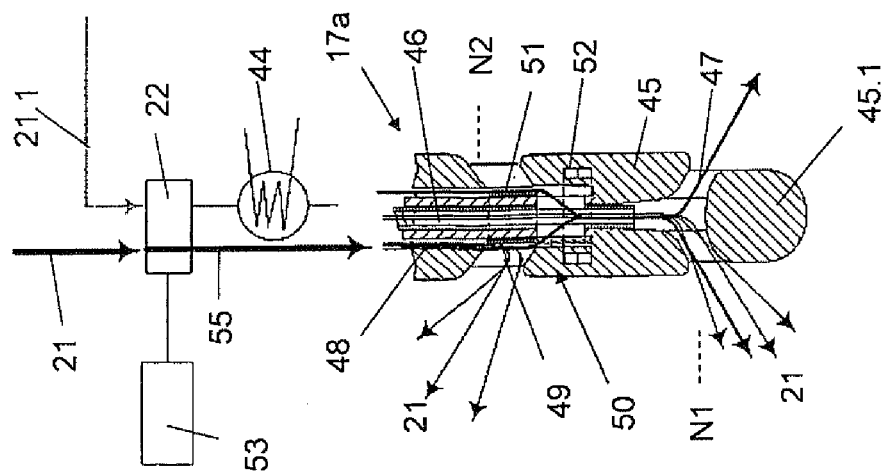

FIGS. 10 12 [sic] show in partial view and in cross section a stretching rod 17a which in its basic function is the same as stretching rod 17, i.e. it serves to guide and control in particular the axial stretching of the respective parison (2) or forming container (11) during the shaping and filling of the respective container (11). The stretching rod (17a) essentially comprises a rod-shaped stretching rod body (45) with a rounded free stretching rod end (45.1). In the stretching rod body (45) are configured a plurality of channels, specifically an inner channel (46) lying on the same axis as the longitudinal axis of the stretching rod (17a), which, close to the end (45.1), opens out at a plurality of outlet openings (47) distributed about the centreline of the stretching rod (17a) on the lower level N1, also an outer annular channel (48) which encloses and is separate from the inner channel (46) and which at a plurality of upper outlet openings (49) distributed about the centerline of the stretching rod (17a) opens on the upper level N2 at the peripheral or enveloping surface of the stretching rod (17a). In the interior of the stretching rod (17a) there is also provided a control valve generally indicated in FIG. 10 by (50) by which a connection between the inner channel (46) and the outer channel (48) can be made or interrupted in a controlled manner. In the depicted embodiment the control valve (50) is essentially formed by an axially moveable sealing ring (51) which is pretensioned in its raised position in FIG. 10 making the connection between channels (46) and (48) by for example a spring (not shown). The sealing ring (51) can be moved against the action of the spring into its lower position interrupting the connection between the channels (46) and (48) by an actuating device, for example by a magnetic coil (52) accommodated in the stretching rod (17a).

Figure 11:
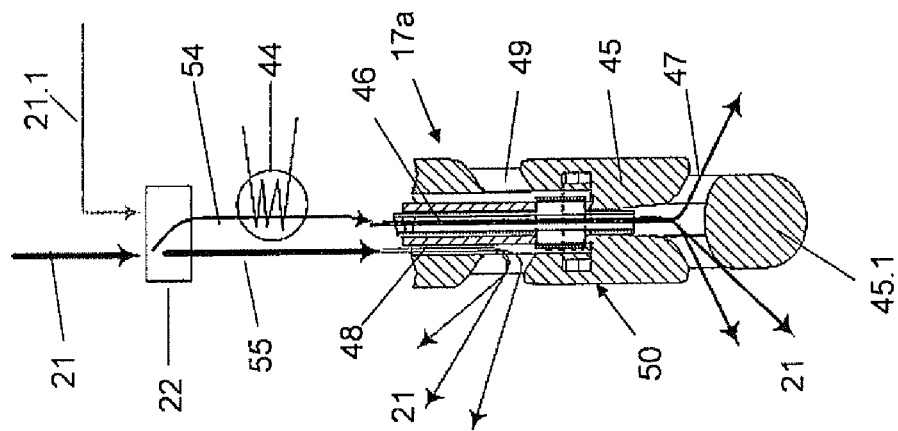

FIGS. 10-12 also depict the multi-port metering valve (22) which is controlled by an electronic controller (53) and which is in turn configured as a multi-port valve connected by a first port or inlet to the storage apparatus (20) not shown in FIG. 10 for the filling substance (21) and by a second port to the storage apparatus (20.1) also not shown in FIG. 10 for the filling substance (21.1). The outlets of the multi-port metering valve (22) are connected by a liquid connection (54) to the inner channel (46) or by a liquid connection (55) to the outer annular channel (48). The cooling unit (44) is disposed in the liquid connection (54). The controller (53) also controls the control valve (50) or its magnetic coil (52), with the control valve (50) being executed in the depicted variant as an electromagnetically, linearly driven system. This has the particular advantage that the closing and opening speeds can be infinitely variably regulated. It is not essential for the control valve (50) to be designed to seal 100%, a small amount of leakage can be tolerated.

The stretching rod (17a) permits a variety of operating modes, for example the simultaneous introducing of the filling substance, e.g. of the filling substance (21) without CO2 content or with reduced CO2 content, on the lower height level (N1) through the outlet openings (47) and on the higher height level (N2) through the outlet openings (49) into the parison 2 or into the forming container (11). For this purpose the control valve (50) is opened by appropriate triggering of the controller (53) for a connection of the two channels (46) and (48), while the multi-port metering valve (22) is triggered by the controller (53) in such a way that only a connection to the liquid connection (55) exists through this metering valve. This operating state is depicted in FIG. 10.

With the control valve (50) closed, by appropriate triggering of the multi-port metering valve (22) it is also possible to establish through this valve a connection for the filling substance (21) to both channels (46) and (48) such that the filling substance (21) is again introduced as indicated by the arrows through the outlet openings (47) and (49) on the different height levels N1 and N2 into the parison (2) or into the forming container (11). In this operating state as depicted in FIG. 11 it is also possible to cool the part-quantity of the filling substance (21) which is fed to the inner channel (46) and which exits the lower outlet openings (47) in the cooling unit (44), or to cool the liquid connection (54) with the filling substance for a subsequent process step.

By appropriately triggering the multi-port metering valve (22) it is also possible to discharge the filling substance (21.1) through the liquid connection (54) in the inner channel (46) for discharge only at the lower outlet openings (47) or on height level N1, and the filling substance (21) for discharge only at the upper outlet openings (49) or on higher height level N2, with the filling substance (21) and (21.1) being discharged either simultaneously, with a time delay or temporally overlapping, and in the case of a time-delayed or temporally overlapping discharge, preferably in such a way that filling substance (21) is first discharged through the upper outlet openings (47) and then filling substance (21.1) through the lower outlet openings (49). This operating state in which filling substance (21.1) is again cooled in the cooling unit (44) is depicted in FIG. 12. The different operating states depicted in FIGS. 10-12 can of course also be combined at will in the respective shaping and filling phase.

It is for example possible during the respective shaping and filling phase to introduce the filling substance (21) through the outlet openings (47) and (49) in a first part-phase according to FIG. 10, to continue introducing the filling substance (21) through the outlet openings (47) and (49) in a subsequent second part-phase according to FIG. 11 and at the same time pre-cool the liquid connection (54) with the filling substance (21) flowing through the cooling unit (44) and then introduce the filling substance (21.1) as shown in FIG. 12 in a third part-phase through the lower outlet openings (47), with the filling substance (21) continuing to be discharged for example through the upper outlet openings (49).

In each of the cases a calmed intermediate zone which delimits the filling substance fractions from one another is formed between height levels N1 and N2. A beneficial effect is exerted by the afore-mentioned electromagnetically driven control valve (50) because it facilitates a low-pulse, and hence low-blend, change-over. A further advantage of this electromagnetically driven control valve (50) is that it is very robust and can be cleaned very easily by rapid and if necessary multiple switching for cleaning purposes during corresponding cleaning cycles.

Figure 13:
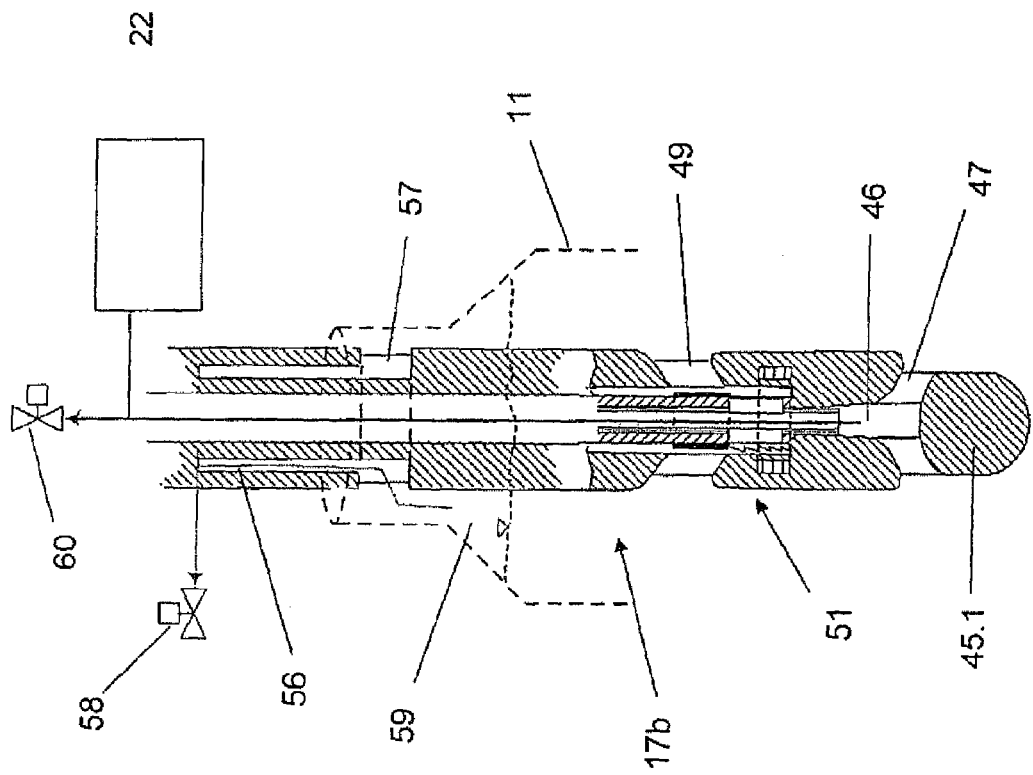
FIG. 13 shows in a representation similar to FIGS. 10-12 a further modified embodiment of the stretching rod of the inventive shaping and filling machine or station.

FIG. 13 shows in a simplified sectional representation and as a further embodiment, a stretching rod (17b) which in essence only differs from the stretching rod (17a) in that as well as the two channels (46) and (48), there is provided in an upper region lying further away from the stretching rod end (45.1) a third annular channel (56) which opens at a plurality of outlet or relief openings (57) on the peripheral or envelope surface of the stretching rod (17b) which are distributed about the centerline of the stretching rod (17b). The head space (59) that is formed in the container (11) above the level of the filling substance is depressurized via the channel (56), controlled for example by a control valve (58) triggered by the controller (53) after the shaping and filling of the respective container (11). A further depressurization of the container (11) after shaping and filling is possible through the outlet openings (47) and—when control valve (50) is open—also through the outlet openings (49), controlled for example by a control valve (60) triggered by for example by the controller (53).

The stretching rods (17a) or (17b) depicted in FIGS. 10-13 or the shaping and filling devices/machines which exhibit these stretching rods also allow the respective parison (2) to be evacuated and/or purged with a for example hot inert gas, and preferably through the lower outlet openings (47), before the actual shaping and filling phase is initiated.

As FIGS. 10-13 show, the outlet openings (47) and (49) or the stretching rod (17a) are configured on their peripheral or envelope surface in such a way that the main flow direction of the medium emerging from the outlet openings (47) or (49) describes an angle of less than 90° to the longitudinal axis of the stretching rod (17a), and specifically at the lower outlet openings (47) such that this angle opens toward the lower stretching rod end (45.1) and at the upper outlet openings (49) such that this angle opens toward that end of the stretching rod (17a) which faces away from the lower stretching rod end (45.1).

It was assumed hereinbefore that during forming and filling the respective parison (2) lies in sealed position against the seal (29) with its open end pointing upward. However embodiments of the shaping and filling station (10) are also possible in which during forming and filling the respective parison (2) lies in sealed position against the seal (29) or against a corresponding seal of the connection element (28) with its open end pointing down. In this case, the annular gap (31) or the partial annular channel (31.2) or another liquid channel provided in the connection element (28) now form the filling substance outlet for the low height level, and the at least one outlet opening (24) the filling substance outlet for the higher height level. The outlet openings (47) and (49) exhibit in particular rounded edges or radii such that local turbulence and cavitation is avoided and a stable layering is achieved. The rounded edges of the outlet openings (47) and (49) at the stretching rod are advantageously provided both radially inward and radially outward.

LIST OF REFERENCE CHARACTERS

1 Feeding device
2 Parison
3 Transfer wheel
4 Heating apparatus
5 Mouth section
6 Heating element
7 Transport apparatus
8 Transfer wheel
9 Process wheel
10 Shaping and filling station
11 Container
12 Extractor wheel
13 Discharge section
14 Input device
15 Sealing element
16 form partition
17, 17a, 17b Stretching bar or stretching rod
17.1 Narrowing 18 Dome of the stretching rod
19 Base of the parison
20, 20.1 Storage apparatus
21,21.1 Filling substance
22 Metering valve
23 Interior space of the stretching rod
24 Outlet opening
25 Non-return valve
26 Vent valve
27 Outlet opening
28 Connection element
29 Seal
30 Interior space of the parison
31 Annular gap
31.1,31.2 Partial annular channel section
32 Longitudinal axis of the bottle or stretching rod
33 Sealing element
34 Counter-element
35 Bearing
36 Feed opening
37 Mould
38 Sealing device
39 Gripper
40 Tool carrier
41 Pivot
42 Line or line section
43 Carbonation unit
44 Cooling unit
45 Stretching rod body
45.1 Stretching rod end
46 Channel
47 Outlet opening
48 Channel
49 Outlet opening
50 Control valve
51 Sealing ring
52 Magnetic coil
53 Control electronics
54, 55 Liquid connections
56 Channel
57 Outlet opening
58 Control valve
59 Head space
60 Control valve

The invention claimed is:

1. A method for producing containers which are filled with a liquid filling substance from parisons made from a thermoplastic material, the method comprising the steps of: thermally conditioning respective of the parisons; and subsequently shaping the parison into the container during a shaping and filling phase in a mold by way of the filling substance as pressure medium, wherein, during the shaping into the container, the parison is guided at least for a time through a stretching rod and is stretched in an axial direction, wherein the filling substance or at least one part-volume of the filling substance is introduced into the parison or into the container being therefrom formed or into the fully formed container on at least two different height levels of the stretching rod.

2. The method according to claim 1, wherein for introducing the filling substance on at least two different height levels at least one component of the filling substance is fed past the stretching rod and at least one further component is fed through the stretching rod.

3. The method according to claim 1, wherein the filling substance comprises at least two fractions or components with different carbon dioxide concentrations.

4. The method according to claim 3, wherein the filling substance or fractions or components thereof with different concentrations of carbon dioxide are fed on the at least two different height levels, with the fraction of the filling substance which contains a higher concentration of carbon dioxide than at least one other fraction of the filling substance, on a lower of the height levels.

5. The method according to claim 3, wherein the filling substance or fractions or components thereof having a higher concentration of carbon dioxide is cooled or is fed cooled, at a temperature below a temperature of that fraction of filling substance which exhibits no carbon dioxide or a lower concentration of carbon dioxide.

6. The method according to claim 3, wherein at least that fraction of the filling substance having a higher concentration of carbon dioxide is fed through the stretching rod.

7. The method according to claim 1, wherein introducing the filling substance takes place on the at least two different height levels with a time delay, simultaneously or temporally overlapping.

8. The method according to claim 1, wherein introducing the filling substance or fractions of the filling substance takes place on the at least two height levels at different pressures.

9. The method according to claim 3, wherein the stretching rod is, in at least certain regions, thermally insulated from the filling substance.

10. The method according to claim 9, wherein the stretching rod is insulated in a region in which the filling substance or fraction of the filling substance which exhibits the higher concentration of carbon dioxide and/or a lower filling substance temperature is fed.

11. The method according to claim 1, including introducing at least one partial stream of the filling substance with low turbulence into an interior space of the parison or of the forming container.

12. The method according to claim 3, including only introducing the filling substance or the fraction of filling substance with a higher concentration of carbon dioxide on a lower height level when the filling substance already introduced into the parison or into the forming container at least completely or almost completely covers a filling substance inlet intended for the introduction of the filling substance having a higher concentration of carbon dioxide.

13. The method according to claim 1, wherein the filling substance is discharged through at least two outlet openings of the stretching rod disposed on the different height levels, so that a main direction of flow of the filling substance at the outlet openings describes an angle of less than 90° to a longitudinal axis of the stretching rod, such that the angle opens toward a free stretching rod end on one height level and toward a side facing away from the free stretching rod end on another height level.

14. The method according to claim 13, wherein, on the at least two different height levels, the filling substance or fractions or components thereof having different concentrations of carbon dioxide are introduced into the parison or into the container being formed therefrom or into the fully formed container, the introduction of the filling substance or of the fraction of the filling substance having a higher concentration of carbon dioxide taking place through at least one outlet opening present on the lower height level and the introduction of the filling substance or of the fraction of the filling substance without carbon dioxide or having a lower concentration of carbon dioxide taking place through at least one outlet opening on the higher height level or through the outlet openings on the lower and higher height levels.

15. A device for producing containers which are filled with a liquid filling substance from parisons made from a thermoplastic material, comprising: a heating section for preheating the parisons; at least one shaping and filling station exhibiting a mold; at least one storage apparatus for supplying the filling substance; and a carbonating unit provided for introducing or releasing carbon dioxide at least in a partial stream of the filling substance, wherein the at least one shaping and filling station or the mold exhibits an element which at least for a time during shaping and filling projects into a respective parison or respective forming container, the element having at least one channel ending at at least one filling substance outlet for introduction of the filling substance into the parison or into a forming container or into the fully formed container, the element being a guiding device or stretching rod with the channel configured in an interior of the stretching rod and at least for a time gripping the parison as the parison is shaped into the container.

16. The device according to claim 15, further comprising a cooling apparatus provided along a line or along a line section for the filling substance in which carbon dioxide is released downstream after cooling and flowing through the line or line section, or which flows to the line or to the line section from a carbonating unit.

17. The device according to claim 15, wherein the at least one shaping and filling station is configured with at least one first filling substance outlet for introduction of the filling substance on a lower height level and with at least one second filling substance outlet for introduction of the filling substance on a higher height level, and wherein the at least one first and the at least one second filling substance outlet are provided so that during shaping and filling the outlets open out into an interior space of the parison or of the forming container.

18. The device according to claim 17, wherein the at least one first and/or second filling substance outlet is provided on the element acting like a filling tube and/or is formed by at least one outlet opening that is configured with rounded edges, and/or that has a shape of a funnel or cup.

19. The device according to claim 17, wherein a centerline of a main flow direction of the at least one first and/or of the one second filling substance outlet or of the at least one opening forming the outlet is inclined at an angle of less than 90° relative to a centerline oriented square to a plane of a support or to a longitudinal axis of the stretching rod, with the angle of the main flow direction of the second filling substance outlet opening towards a side facing a stop for an open end of the respective parison and/or the angle of the main flow direction of the first filling substance outlet opening to a side facing away from the stop.

20. The device according to claim 19, wherein the outlet is inclined at an angle of less than 80°.

21. The device according to claim 20, wherein the outlet is inclined at an angle of 60-75°.

22. The device according to claim 15, wherein the element acting like a filling tube is controllable by axial displacement so that introduction on at least two different height levels is effected through the at least one filling substance outlet provided on the element.

23. The device according to claim 15, wherein at least two channels are provided in the stretching rod, a first of the channels opens out at at least one outlet opening on a low height level of the stretching rod and a second channel opens out at at least one outlet opening on a higher height level of the stretching rod.

24. The device according to claim 23, further comprising at least one control valve in the stretching rod for controlling liquid paths or liquid channels configured in the stretching rod for the filling substance.

25. The device according to claim 24, wherein the first and the second channel can be controlled by the control valve so as to be connected and separated from one another, the control valve having at least one valve element movable in a longitudinal axis of the stretching rod.

26. The device according to claim 23, wherein, in the stretching rod, at least one third channel is configured which opens at at least one outlet opening which is at such a distance away from the at least one outlet opening on the higher height level in the direction of the longitudinal axis of the stretching rod that the opening is located on a height level above the higher height level and, in the case of fully formed containers, inside a head space of the container that is not occupied by the filling substance, with the at least one outlet opening being connected via the channel with a relief section for relieving the head space on completion of a shaping and filling phase, said relief section exhibiting a control valve and/or a throttle.

27. The device according to claim 15, wherein the at least one channel is connected, under control of at least one control valve, to a relief channel and/or to a vacuum source and/or to an inert gas source.

* * * * *